United States Patent

[11] 3,569,614

[72] Inventor Thomas F. Hanlon
  337 Tremont Ave., Fort Lee, N.J. 07024
[21] Appl. No. 814,941
[22] Filed Apr. 10, 1969
[45] Patented Mar. 9, 1971

[54] LIQUID CRYSTAL COLOR MODULATOR FOR ELECTRONIC IMAGING SYSTEMS
6 Claims, 3 Drawing Figs.

[52] U.S. Cl. .................................................. 178/5.4
[51] Int. Cl. .................................................. H04n 9/12
[50] Field of Search ............................. 178/5.4, 5.4 (BDP); 350/160 (LC), (Inquired)

[56] References Cited
UNITED STATES PATENTS

| | | | |
|---|---|---|---|
| 2,623,942 | 12/1952 | Schlesinger | 178/5.4(BDP) |
| 2,632,045 | 3/1953 | Sziklai | 178/5.4(BDP) |
| 2,888,513 | 5/1959 | Melamed et al. | 178/5.4(BDP) |
| 3,428,743 | 2/1969 | Hanlon | 178/5.4(BDP) |
| 3,499,112 | 3/1970 | Heilmeier et al. | 178/7.7 |

Primary Examiner—Richard Murray
Attorney—Frank Ledermann

ABSTRACT: This invention utilizes the principle that a nematic liquid crystal, which is normally clear and transparent, is darkened upon application of a voltage thereto and can be darkened sufficiently to prevent light from passing therethrough. In a three color system, the instant color modulator blocks out two unselected colors by applying voltage to the liquid crystal behind the unselected color filters thus permitting the selected color to pass through the transparent liquid crystal behind its filter.

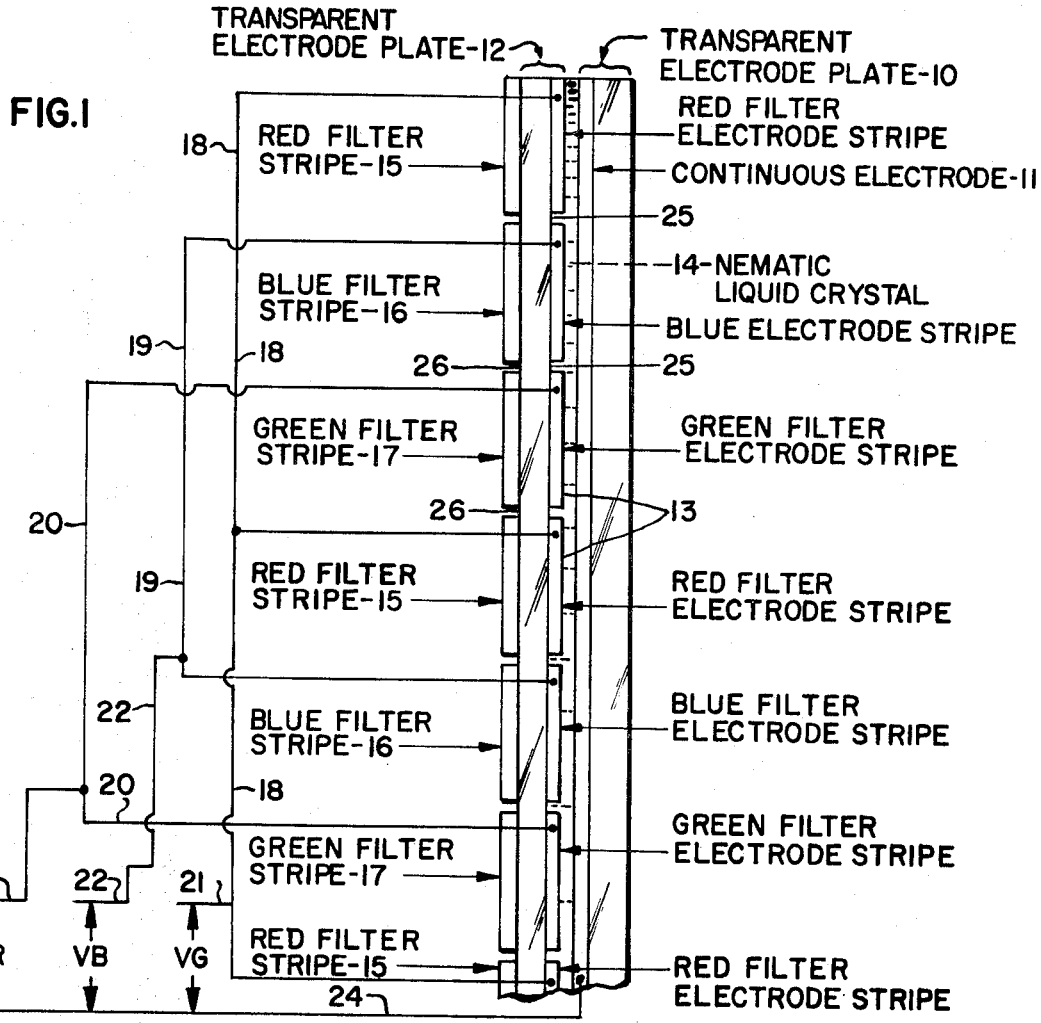
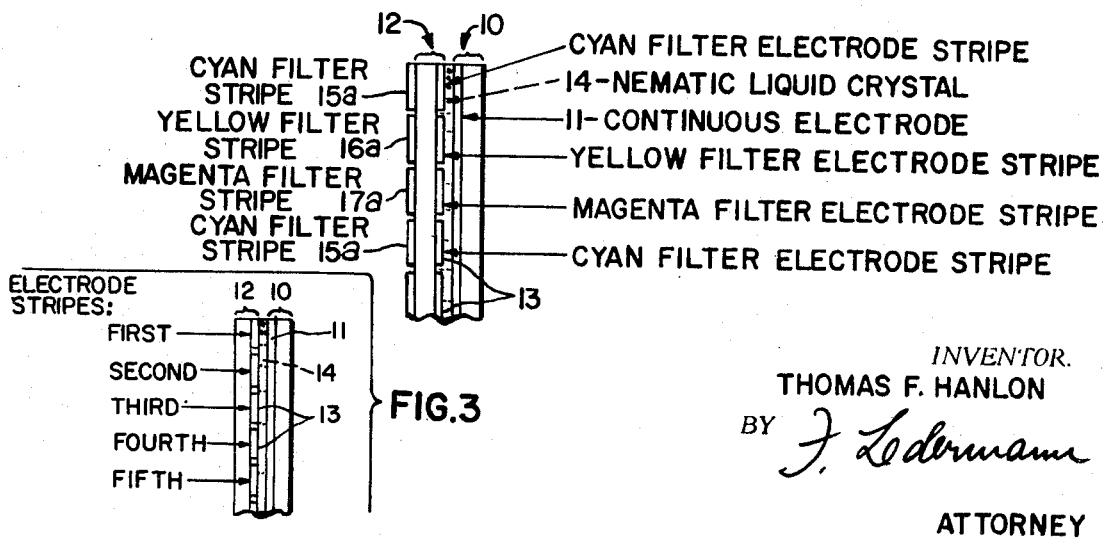

LIQUID CRYSTAL COLOR MODULATOR FOR ELECTRONIC IMAGING SYSTEMS

The color image control modulator herein disclosed has applications in many fields; for example, in television transmission and reception, facimile transmission systems, electronic photographic systems, graphic arts, color printing systems and electronic copying systems.

Ornstein and Kast, in "Transactions of the Faraday society," 29, 931 (1933) first reported on the effects of a voltage potential on nematic liquid crystals. In their normal quiescent or ordered molecular state nematic liquid crystals are clear and transparent. But when such liquid crystal is placed between two electrodes and a voltage is applied, the ordered molecular structure is disturbed and molecular swarms or density centers are formed, darkening the liquid crystal. Thus the liquid crystal can be made a modulator of light, producing density changes through the range from clear to black. This principle is utilized in the present invention. It is to be understood that the voltages hereinafter mentioned are of a magnitude sufficient to darken the liquid crystal to a degree such as to make it opaque to prevent light from passing through.

In The Accompanying Drawing

FIG. 1, is a greatly magnified diagrammatic side view of a fragment of a color modulator and a wiring diagram, wherein the modulator utilizes the three colors red, blue and green.

FIG. 2 is a reduced diagrammatic view of the modulator per se but utilizing instead the three subtractive colors cyan, yellow and magenta.

FIG. 3 is a reduced diagrammatic view of a modified form of the modulator in which the color filters are omitted.

Referring in detail to the drawing, the instant modulator has the form of a sandwichlike structure which includes two transparent electrode plates 10 and 12. Among others, the Pittsburgh Plate Glass Company, now called PPG Co., markets transparent electrode plates under the trademark NESA, which are 95 percent transparent and have the electrode coated on a glass base.

The plate 10 has on one side thereof a continuous uninterrupted electrode 11. The plate 12 has on one side thereof a multiplicity of closely spaced horizontal electrode stripes 13, for example, 800 to the inch, the spaces 25 between the electrode stripes being nonconducting. These two plates are positioned relatively close together with their electrode bearing sides facing toward each other. The space between the two plates is filled with a nematic liquid crystal, 14.

In repeated sequences downward, FIG. 1, three color filters red 15, blue 17 and green 17 are shown applied or coated on the blank outer (left-hand) surface of the plate 12 in the form of stripes having the same vertical dimension as the electrode stripes 13. Each such filter stripe lies precisely in a common horizontal plane with one of the electrode stripes. The filters could instead by applied on the outer (right-hand) surface of the plate 10, not shown. The spaces between the electrode stripes, shown at 25, or those shown at 26 between the filter stripes, are darkened or made opaque in any suitable manner or by any suitable means such as, for example, by applying a black die, to provide light obstructing means to prevent light from a source from passing through the aligned spaces 25, 26. Preferably the spaces 25 are so treated.

For the sake only of this discussion, and assuming that a light source, not shown, is at the left of the modulator, FIG. 1, the electrode stripes behind the red filters will be referred to as the red electrode stripes, those behind the blue filters as the blue electrode stripes, and those behind the green filters as the green electrode stripes; they are so identified by legends in FIG. 1. Leads 18 tie all the red electrode stripes to a common lead 21, leads 19 tie all blue electrode stripes to a common lead 22, and leads 20 tie all the green electrode stripes to a common lead 23. An additional lead 24 extends from the continuous electrode 11.

When no voltage is applied between the lead 24 and any of the common leads 21, 22, 23, the modulator when seen through is white. When red is to be seen by a viewer positioned to the right of the modulator, FIG. 1, then voltages VB and VG are simultaneously applied, thus blocking out the blue and green. When blue is called for, voltages VR and VG are simultaneously applied, thus blocking out the red and green. And when green is called for, voltages VR and VB are applied, thus blocking out red and blue.

In the application of the instant modulator to produce a color television image in a black-and-white receiver, the standard NTSC color signal is converted to a field sequential color signal; then applying the voltage from this signal to the kinescope of the receiver and to the instant modulator converts this voltage to color images when the modulator is positioned between the kinescope and the viewer. When a standard NTSC color signal is received in a conventional color receiver it contains the voltages of the simultaneously transmitted colors. The NTSC signal is transmitted as a subcarrier at 3.58 mc. The color information is separated into two parts, hue and saturation. The hue is the color, that is, red versus yellow, and the saturation is the depth of color, that is, bright red versus pink. At the color receiver the hue of the picture is determined by the phase of the received subcarrier and the saturation is determined by the amplitude of the signal. The reference phase, which is transmitted during the horizontal retrace as an eight-cycle burst, establishes a reference for the color phase information. A certain phase angle corresponds to each of the primary colors; that is, 90° from the reference phase is the red information angle, 180° for the blue, and 300 degrees for the green. In the instant modulator only one signal at a time is required. With the modulator in front of a black-and-white TV tube, when the color red is required to be seen, the field sequential converter demodulates along the 90° phase; for blue it switches to 180°; and for green it switches to 300°. Thus voltage is applied to the blue and green electrode stripes when red is to be seen, hence blocking out the unselected blue and green, etc. The color switching operation continues automatically through repeated sequences of red, blue and green, as is well known, and the eye by persistence of vision superimposes these three color pictures to give a full color effect.

Another application of the instant color modulator is in producing a color image in a black-and-white closed circuit television system, by placing one such modulator over the lens of a black-and-white television camera and another such modulator over the black-and-white cathode ray tube of the receiver. This system operates in the same manner as described above except that the signal does not need to be converted from NTSC to field sequential since it is already field sequential from the camera to the receiver. Both the camera color modulator and the receiver color modulator are activated in synchronism by utilizing the sync circuits of the camera and the receiver. When the red filters are in front of the camera lens the same red filters will appear in front of the receiver, the unselected colors being blocked out. This system can also be used for special broadcast transmission of field sequential color images. (In 1950 the FCC authorized CBS to begin commercial color broadcasts by the field sequential method but this authority was withdrawn a short time later in favor of the all electronic NTSC system. The failing of the CBS system was due to the fact that they used large rotating color wheels in front of the TV camera and the home receivers. These were mechanical and cumbersome; for large pictures the rotating wheels had to be excessively large). The instant color modulator allows for an all electronic field sequential system; it is a solid state device that can be made in any size and that uses very simple solid state circuits for operation.

The instant color modulator is also applicable to produce a color television image in a black-and-white receiver utilizing the ultrasonic modulator disclosed in my copending application Ser. No. 782,659, filed Dec. 10, 1968, entitled "Black-and-white Image Control by Ultrasonic Modulation of a Nematic Liquid Crystal." This is done by positioning the instant color modulator between the said ultrasonic modulator and the viewer, converting the standard NTSC signal to a field sequential color signal, then applying the voltage from the latter to the said ultrasonic modulator whence the color modulator converts this voltage to a field sequential color image. The ultrasonic modulator is substituted for the cathode ray tube in the black-and-white receiver.

The instant color modulator is also useful in producing color transmission and reception over facsimile systems. Such systems operate on the field sequential, line sequential or dot sequential method. When scanning, the instant color modulator is placed in front of the lens of a black-and-white television camera, and the material to be reproduced is scanned; or the color modulator is placed between the material to be scanned and a photomultiplier tube, or between a flying spot scanner and the material to be scanned and a photomultiplier tube. In all of the three scanning systems described, the picture elements and color elements are scanned in sequence and converted to voltages for transmission with a sync signal over coaxial lines, telephone lines or broadcast circuits. On the receiving end the images may be converted to color images by applying the transmitted picture and color voltages to a glow modulator tube, cathode ray tube or to my above-identified ultrasonic modulator, in each case together with the instant color modulator which will lay down proper colors on color film materials or to separate black-and-white color separation negatives or positives for transfer to other materials or printing plates. In receiving, the modified form of the instant color modulator illustrated in FIG. 3 may be utilized in the manner just described. This modified form is identical to the form of FIG. 1 except that it is devoid of any color filter stripes. The transmitter modulator of FIG. 1 does transmit the color densities scanned through its color filter stripes 15, 16 and 17 but they are reproduced in the receiver modulator of FIG. 3 and can be transferred to color blind materials such as diazo or vesicular film. In this case the receiver modulator only reproduces black-and-white densities but these represent synchronized color densities scanned and therefore can be printed on the aforementioned color blind films for black and white color separation applications. These various processes can be used in image conversion systems, graphic arts and various electronic photography systems.

Another application of the instant color modulator is in producing a three color electronic image in office copying machines. Here the color modulator is placed between the colored material to be reproduced and a selenium drum or zinc oxide coated material. A light source is reflected off the material to be reproduced, that is, the original, and the reflected image is passed through the color modulator. As before, when a voltage is applied to the transparent electrodes of the color modulator, the color filters of the unselected colors now being electrically charged cannot be seen, the selected color, having its electrodes unactivated, reads out that component of the colored original being copied. This information is impressed on a selenium drum or zinc oxide coated material positively charged. This electrostatic image represents one of the three colors of the original. Color toners negatively charged are electrically discharged to the electrostatic surface in sequence as each color is read out. Each toner of one of the three colors is discharged separately by electric synchronization to the instant color modulator. Between successive sequences the toner of each color is heated and fixed and the positive charge removed from the electrostatic surface. When the three toners have been applied corresponding to the color densities scanned by the color modulator, a full color electrostatic image will be reproduced. The color image is built up in three scanning sequences.

The form of the instant color modulator shown in FIG. 2 is structurally similar to that of FIG. 1 but instead of the red, blue and green filters the subtractive colors cyan, yellow and magenta are substituted. The form of FIG. 1 may be used in all imaging systems mentioned above; however, in imaging systems other than television, for example, facsimile transmission, graphic arts, and copying systems, another method has been to use the subtractive colors, shown in FIG. 2, rather than the additive colors shown in FIG. 1.

The wiring diagram of FIG. 1 is also applied to, but not shown in, FIGS. 2 and 3. However, since three different color stripes are absent in the form of the modulator shown in FIG. 3, the electrode stripes 13 are designated by legends, counting down from the top, as the first, second, third etc. stripes. Thus, as the voltages VR, VB and VG are sequentially applied, the VR voltage is applied to the first, fourth, seventh etc. stripes, the voltage VB to the second, fifth, eighth etc. stripes, and the voltage VG to the third, sixth, ninth etc. stripes.

I claim:

1. A liquid crystal color modulator for electronic imaging systems in the form of a sandwichlike structure composed of a first transparent electrode plate having on one side thereof a continuous uninterrupted electrode, a second transparent electrode plate having on one side thereof a multiplicity of closely spaced horizontal electrode stripes, said plates being positioned closely spaced from each other with the electrode bearing sides thereof facing toward each other, the space between said plates being filled with a nematic fluid crystal, one of said plates having on the other side thereof a like multiplicity of closely spaced color filter stripes each of which lies precisely in a common horizontal plane with one of said electrode stripes, light obstructing means on either of said plates positioned in the horizontal planes of the spaces between said electrode stripes, said color filter stripes consisting of repeated sequences of three different colors, branch leads connecting all of the electrode stripes in common horizontal planes with the filter stripes of the first of said colors to a first common lead, branch leads connecting all of the electrode stripes in common horizontal planes with the filter stripes of the second of said colors to a second common lead, branch leads connecting all of the electrode stripes in common horizontal planes with the filter stripes of the third of said colors to a third common lead, and a lead extending from said continuous electrode, whereby when voltage is applied simultaneously between any two of said common leads and said last-named lead the liquid crystal in the planes of the electrode stripes thus electrically charged is darkened and prevents light from a source directed to the modulator from passing therethrough while the liquid crystal in common planes with the remaining electrode stripes which are not electrically charged remains clear and transparent and permits said light to pass through the filter stripes in said last-named common planes so that only the color of said last-named filter stripes passes through the modulator, the voltage being applied sequentially to three different pairs of said common leads thereby sequentially blocking out two unselected colors while permitting the selected color to pass through the modulator.

2. A liquid crystal color modulator according to claim 1, wherein said three different colors consist of the additive colors red, blue and green.

3. A liquid crystal color modulator according to claim 1, wherein said three different colors consist of the subtractive colors cyan, yellow and magenta.

4. A liquid crystal color modulator according to claim 1, wherein said other side of said one of said plates is positioned facing toward said source of light.

5. A liquid crystal color modulator according to claim 1, said one of said plates comprising said second plate.

6. A liquid crystal modulator for electronic imaging systems in the form of a sandwichlike structure composed of a first transparent electrode plate having on one side thereof a continuous uninterrupted electrode, a second transparent electrode plate having on one side thereof a multiplicity of closely spaced horizontal electrode stripes, said plates being positioned closely spaced from each other with the electrode bearing sides thereof facing toward each other, the space between said plates being filled with a nematic liquid crystal, light obstructing means on either of said plates positioned in the horizontal planes of the spaces between said electrode stripes, branch leads connecting a first group of said electrode stripes comprising the first, fourth, seventh etc. electrode stripes to a first common lead, branch leads connecting a second group of said electrode stripes comprising the second, fifth, eighth etc. electrode stripes to a second common lead, branch leads connecting a third group of said electrode stripes comprising the third, sixth, ninth etc. electrode stripes to a third common lead, and a lead extending from said continuous electrode, whereby when voltages are applied sequentially between said last-named lead and three different pairs of said common leads the liquid crystal in the horizontal planes of two of said three groups are sequentially darkened while leaving transparent the liquid crystal in the horizontal planes of the remaining one of said three groups.